US008551347B2

(12) United States Patent
Baer et al.

(10) Patent No.: US 8,551,347 B2
(45) Date of Patent: *Oct. 8, 2013

(54) METHODS FOR CREATING A STEPPED PERPENDICULAR MAGNETIC POLE VIA MILLING AND/OR METAL LIFTOFF

(75) Inventors: Amanda Baer, Campbell, CA (US); Wen-Chien David Hsiao, San Jose, CA (US); John I. Kim, San Jose, CA (US); Vladimir Nikitin, Campbell, CA (US); Trevor W. Olson, San Jose, CA (US); John Bruce Piggott, Jr., San Jose, CA (US); Yuan Yao, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 1324 days.

This patent is subject to a terminal disclaimer.

(21) Appl. No.: 12/341,866

(22) Filed: Dec. 22, 2008

(65) Prior Publication Data

US 2010/0159154 A1 Jun. 24, 2010

(51) Int. Cl.
*G11B 5/127* (2006.01)
*B44C 1/22* (2006.01)

(52) U.S. Cl.
USPC .............. 216/22; 216/40; 216/47; 29/603.14; 427/131

(58) Field of Classification Search
None
See application file for complete search history.

(56) References Cited

U.S. PATENT DOCUMENTS

| 5,277,749 A | * | 1/1994 | Griffith et al. | 216/40 |
| 5,402,295 A | | 3/1995 | Suzuki et al. | 36/126 |
| 6,239,955 B1 | * | 5/2001 | Dovek et al. | 360/321 |
| 7,019,943 B2 | | 3/2006 | Sato | 360/126 |
| 7,185,415 B2 | * | 3/2007 | Khera et al. | 29/603.12 |
| 7,244,368 B2 | * | 7/2007 | Suda et al. | 216/22 |
| 7,297,470 B2 | * | 11/2007 | Cornwell et al. | 430/315 |
| 7,605,006 B2 | * | 10/2009 | Morijiri et al. | 438/3 |
| 8,186,040 B2 | * | 5/2012 | Baer et al. | 29/603.16 |
| 2002/0148105 A1 | * | 10/2002 | Han et al. | 29/603.14 |
| 2004/0160700 A1 | * | 8/2004 | Kagami et al. | 360/244 |
| 2006/0098339 A1 | | 5/2006 | Koyama et al. | 360/126 |
| 2007/0133125 A1 | | 6/2007 | Yokoyama | 360/126 |
| 2008/0074782 A1 | | 3/2008 | Guthrie et al. | 360/110 |
| 2008/0096114 A1 | * | 4/2008 | Li et al. | 430/5 |

OTHER PUBLICATIONS

J. Kishigami et al., "Three-Dimensional Pole Edge Effect on Narrow Track Film Heads" IEEE Transactions on Magnetics, vol. 24, No. 6, Nov. 1988.

* cited by examiner

*Primary Examiner* — Anita Alanko
(74) *Attorney, Agent, or Firm* — Zilka-Kotab, PC (57) ABSTRACT

A method in one embodiment includes forming a layer of a nonmagnetic material above an upper surface of a substrate; forming a resist structure above the layer of nonmagnetic material, wherein the resist structure has an undercut; removing a portion of the layer of nonmagnetic material not covered by the resist structure; depositing a layer of magnetic material above the substrate adjacent a remaining portion of the layer of nonmagnetic material such that at least portions of the layer of magnetic material and the remaining portion of the layer of nonmagnetic material lie in a common plane; removing the resist structure; and forming a write pole above the layer of magnetic material and the remaining portion of the layer of nonmagnetic material. Additional methods are also presented.

19 Claims, 11 Drawing Sheets

METHODS FOR CREATING A STEPPED PERPENDICULAR MAGNETIC POLE VIA MILLING AND/OR METAL LIFTOFF

FIELD OF THE INVENTION

The present invention relates to data storage systems, and more particularly, this invention relates to stepped magnetic poles used in magnetic heads for storage of data.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Conventional magnetic heads have become smaller and smaller, requiring more elements to be placed in smaller areas. The physical parameter reductions that are required for these conventional heads (i.e., narrower pole width, thinner write pole, shorter write shield throat height, narrower gap widths between the write pole and the write shield, etc.) may cause a substantial drop in the write field strength as compared with write heads from a generation ago, which had lower areal density. Therefore, it would be advantageous to have a magnetic head design that can accommodate all the elements in the smaller space requirements, without the substantial loss of write field strength.

SUMMARY OF THE INVENTION

A method in one embodiment includes forming a layer of a nonmagnetic material above an upper surface of a substrate; forming a resist structure above the layer of nonmagnetic material, wherein the resist structure has an undercut; removing a portion of the layer of nonmagnetic material not covered by the resist structure; depositing a layer of magnetic material above the substrate adjacent a remaining portion of the layer of nonmagnetic material such that at least portions of the layer of magnetic material and the remaining portion of the layer of nonmagnetic material lie in a common plane; removing the resist structure; and forming a write pole above the layer of magnetic material and the remaining portion of the layer of nonmagnetic material.

A method according to another embodiment includes forming a layer of a nonmagnetic material above an upper surface of a substrate, wherein the substrate comprises a shaping layer for a perpendicular writer pole; forming a resist structure above the layer of nonmagnetic material, wherein the resist structure has an undercut; removing a portion of the layer of nonmagnetic material not covered by the resist structure; depositing a layer of magnetic material above the substrate adjacent a remaining portion of the layer of nonmagnetic material such that at least portions of the layer of magnetic material and the remaining portion of the layer of nonmagnetic material lie in a common plane, wherein a thickness of the layer of magnetic material is about the same as a thickness of the layer of nonmagnetic material; removing the resist structure; and forming a write pole above the layer of magnetic material and the remaining portion of the layer of nonmagnetic material.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method comprises forming a layer of a nonmagnetic material above an upper surface of a substrate; forming a resist structure above the layer of nonmagnetic material, wherein the resist structure has an undercut; removing a portion of the layer of nonmagnetic material not covered by the resist structure; depositing a layer of magnetic material above the substrate adjacent a remaining portion of the layer of nonmagnetic material such that at least portions of the layer of magnetic material and the remaining portion of the layer of nonmagnetic material lie in a common plane; removing the photoresist structure; and forming a write pole above the layer of magnetic material and the remaining portion of the layer of nonmagnetic material.

In another general embodiment, a method comprises forming a layer of a nonmagnetic material above an upper surface of a substrate, wherein the substrate comprises a shaping layer for a perpendicular writer pole; forming a resist structure above the layer of nonmagnetic material, wherein the resist structure has an undercut; removing a portion of the layer of nonmagnetic material not covered by the resist structure; depositing a layer of magnetic material above the substrate adjacent a remaining portion of the layer of nonmagnetic material such that at least portions of the layer of magnetic material and the remaining portion of the layer of nonmagnetic material lie in a common plane, wherein a thickness of the layer of magnetic material is about the same as a thickness of the layer of nonmagnetic material; removing the photoresist structure; and forming a write pole above the layer of magnetic material and the remaining portion of the layer of nonmagnetic material.

Figure 1:
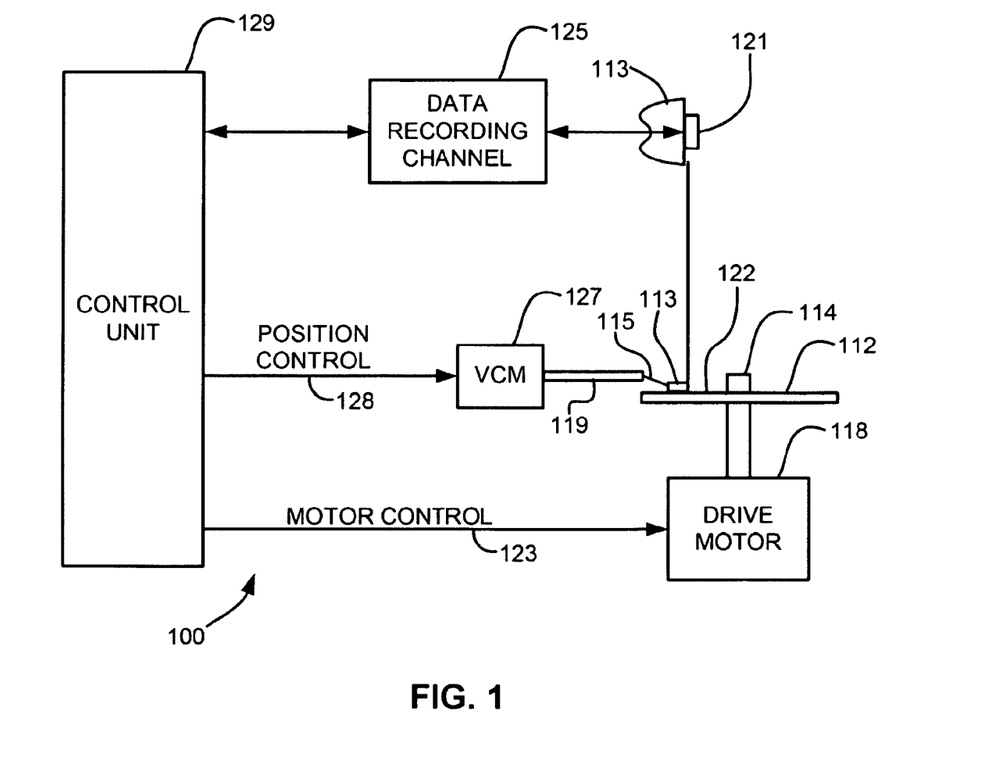
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128.

The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
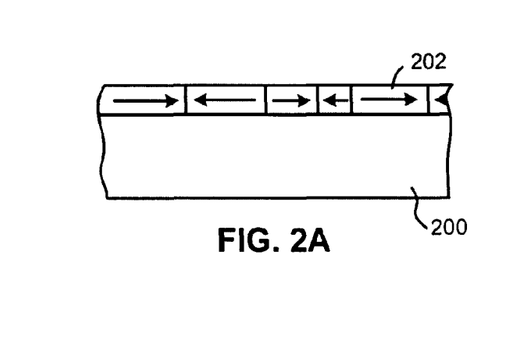
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
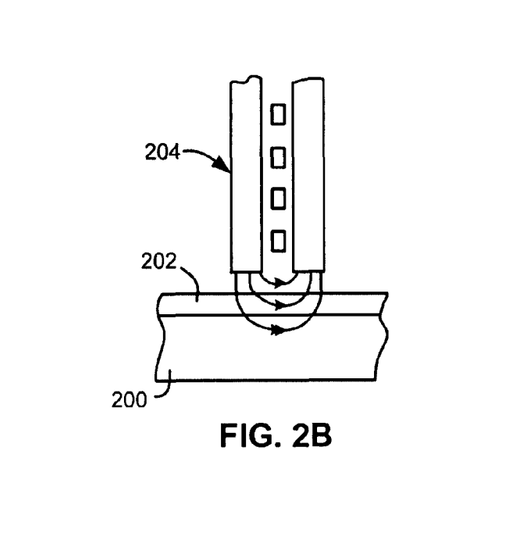
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figures 2C, 2D, 2E:
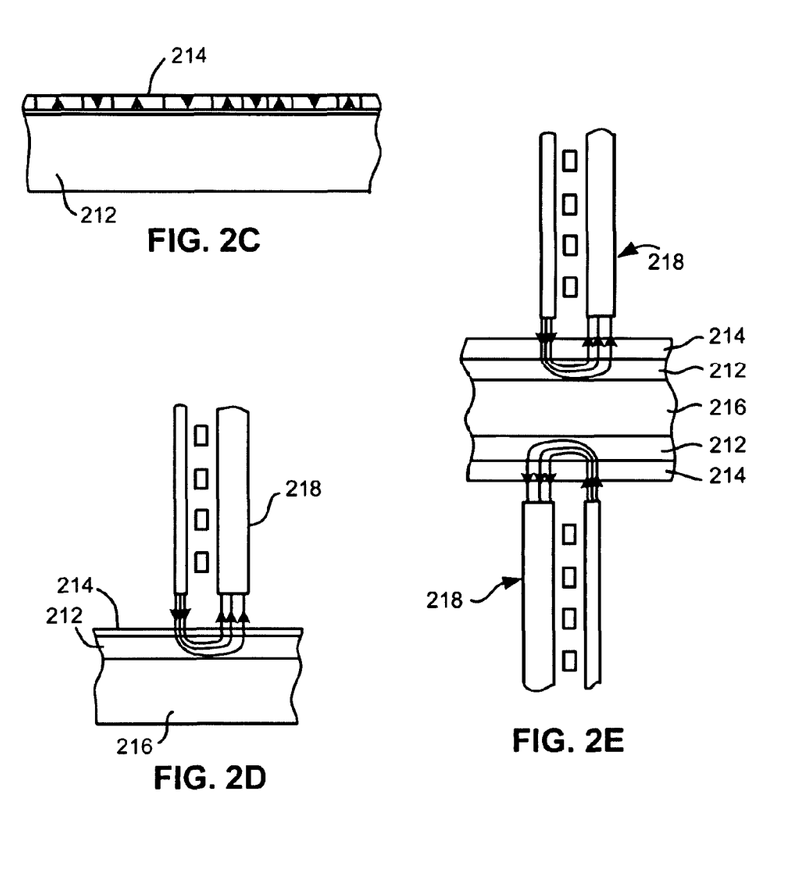
FIG. 2C is a magnetic recording medium utilizing a perpendicular recording format.
FIG. 2D is a schematic representation of a recording head and recording medium combination for perpendicular recording on one side.
FIG. 2E is a schematic representation of a recording apparatus adapted for recording separately on both sides of the medium.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
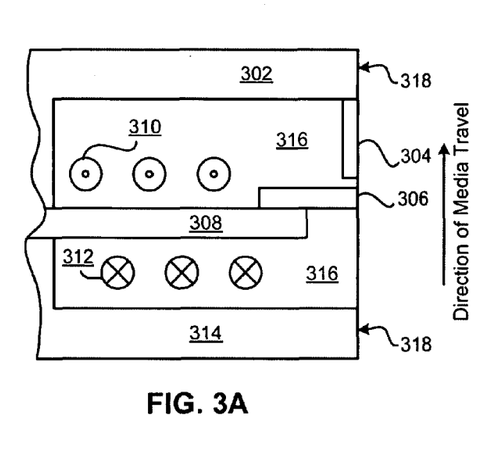
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
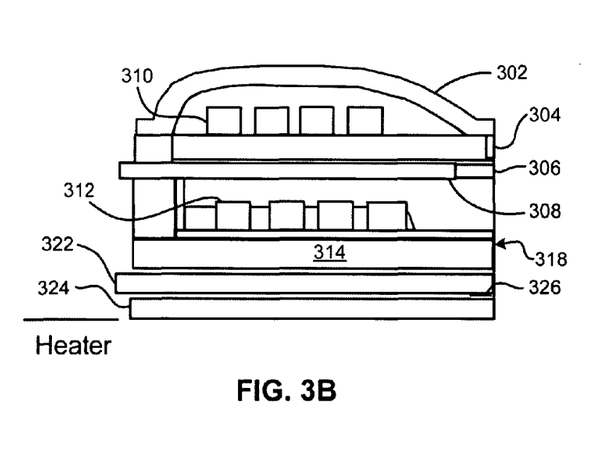
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
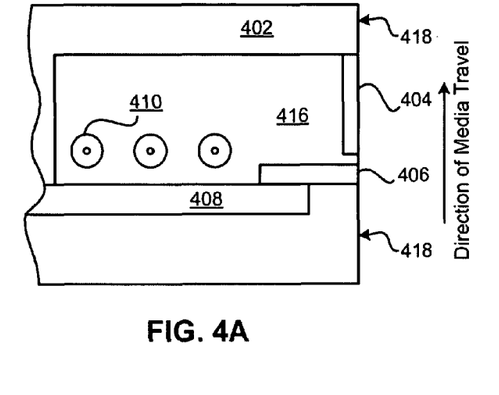
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
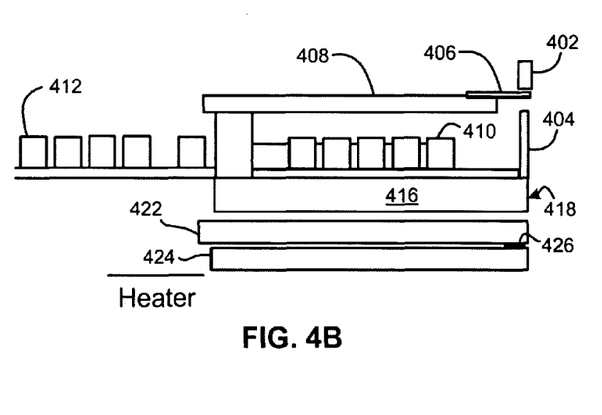
FIG. 4B is a cross-sectional view of one particular embodiment of a piggyback magnetic head with looped coils.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Generally, described herein are methods to build a stepped main pole design, which may add an extra layer of high-moment material beneath the main pole laminate, with the edges thereof recessed from the ABS by some controlled distance so that there is substantially no increase in pole thickness.

Now referring to FIGS. 5A-5H, a method is shown according to one embodiment. The method may be used in the context of functionality of FIGS. 1-4B, but it is in no way limited to only being used in conjunction with FIGS. 1-4B. The method described below may be used in any desired environment.

Figure 5A:
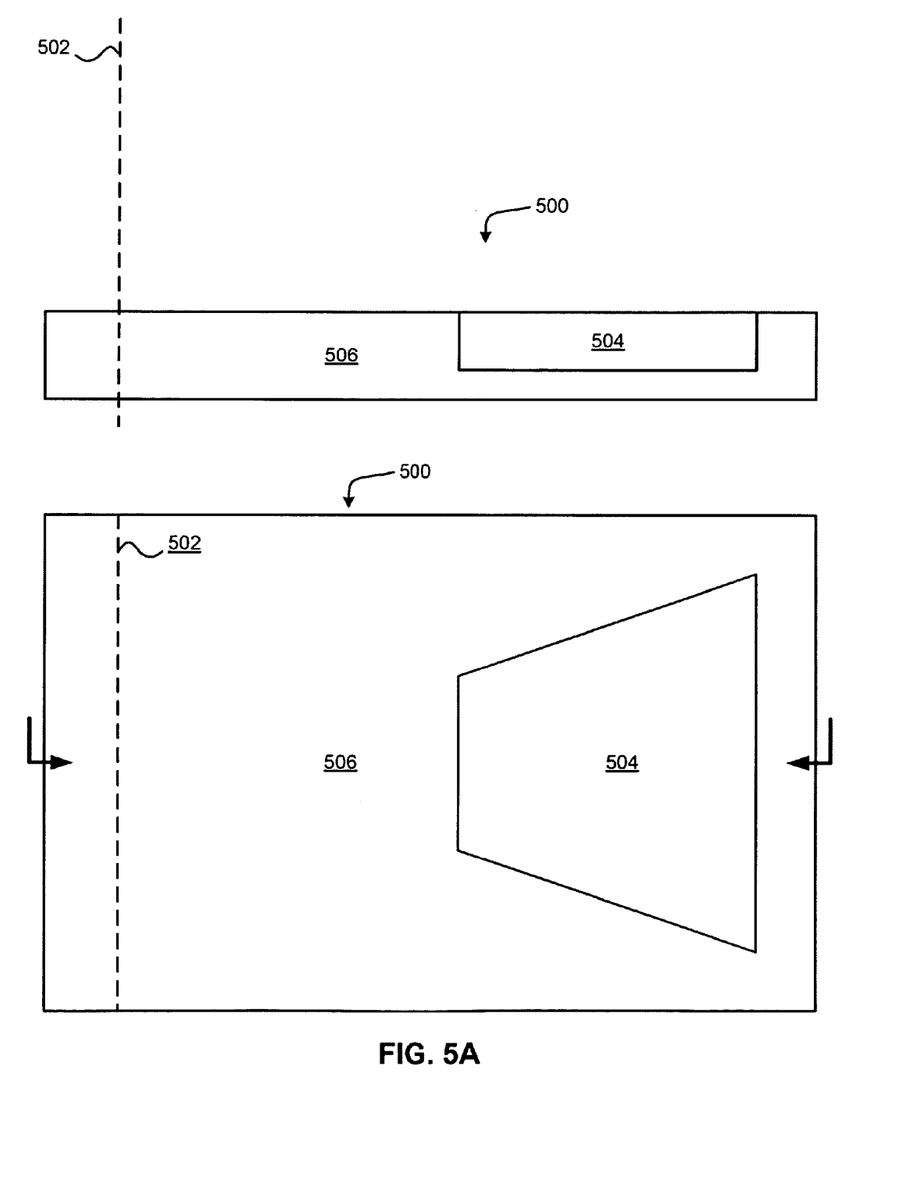
FIGS. 5A-5H show structures which may be formed through a method according to one embodiment.

In FIG. 5A, a cross-sectional view (above) and a top view (below) are shown according to some embodiments. The cross-sectional view is taken from the plane formed by the two arrows on either side of the structure 500 in the top view. In FIG. 5A, a potential air bearing surface (ABS) 502 defining point is shown as a dashed line, which represents the point in which the structure 500 may be cut, planarized, etc., to form the ABS after other processing has taken place. This point may be moved to the left or the right, depending on the desired placement of the ABS in the finished structure.

A substrate 506 may be included in and help to support the structure 500, and may act as a surface on which to place other materials to form layers. The substrate 506 may include a shaping layer 504 (P2) for a perpendicular write pole. The shaping layer 504 may be processed so that the upper surface of the shaping layer 504 may be flush to the upper surface of other portions of the substrate 506, through any process known by one skilled in the relevant art, such as mechanical polishing, electro polishing, planarizing, etc. In some embodiments, the upper surface of the shaping layer 504 may be planarized, but may not be flush with the upper surface of other portions of the substrate 506. The shaping layer 504, in some preferred embodiments, may have the shape of a trapezoid or triangle portion, where the narrower section is directed toward the ABS 502.

Figure 5B:
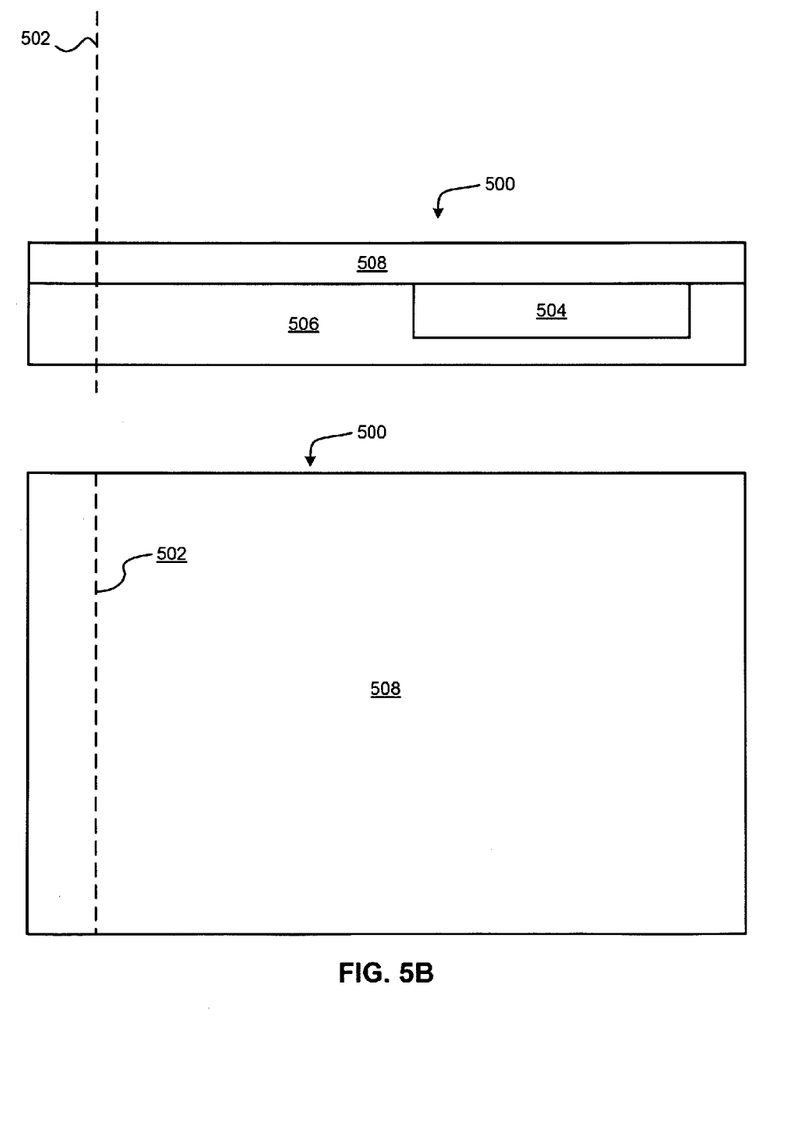

In FIG. 5B, a nonmagnetic layer 508 may be formed above an upper surface of the substrate 506 and/or shaping layer 504. The nonmagnetic material may be comprised of any nonmagnetic material, such as alumina, etc. In some embodiments, the nonmagnetic layer may be formed full film according to any technique as would be known by one of reasonable skill in the relevant art, such as plating, atomic layer deposition (ALD), sputtering, etc.

Figure 5C:
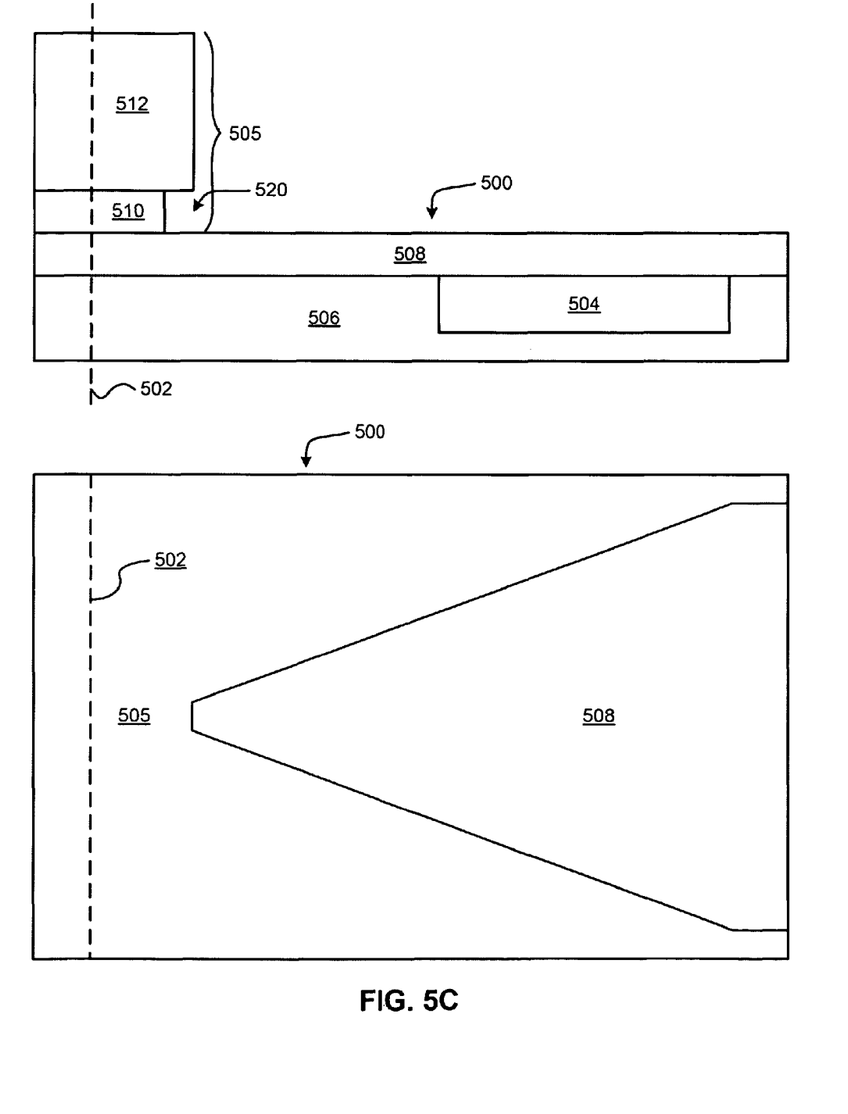

In FIG. 5C, a resist structure 505 may be formed above the nonmagnetic layer 508, wherein the resist structure 505 may have an undercut 520. The resist structure 505 may or may not overlie the shaping layer 504 and/or the ABS 502. Also, in some embodiments, a release layer 510 may be formed above an upper surface of the nonmagnetic layer 508 such that the release layer 510 is able to be easily removed from the upper surface of the nonmagnetic layer 508, thus releasing any layer formed above the release layer 510, such as a resist layer 512. As shown in FIG. 5B, the resist layer 512 may be formed above all upper surfaces of the structure 500, or may be formed only above areas outside of a triangular shape, where the upper surfaces of the nonmagnetic layer 508 may remain exposed. In some embodiments, the release layer 510 may be PMGI or any other material that is removable or detachable from the layer below, such as the nonmagnetic layer 508 by contacting the release layer 510 with a solvent, such as ethyl acetate, acetone, acetic acid, etc. In other embodiments, the release layer 510 may be removable or detachable with the application of heat, cold, or contact with some other material that causes a chemical reaction or state change in the release layer 510.

In some embodiments, the resist structure 505 may be a bilayer photoresist comprising a photoresist and a release layer (such as release layer 508). In this embodiment, the resist structure 505 can have resisting properties for milling, etching, deposition, etc., around the structure, but also have releasing properties, so that the resist structure 505 can be more easily removed than if it was only comprised of a photoresist layer.

Figure 5D:
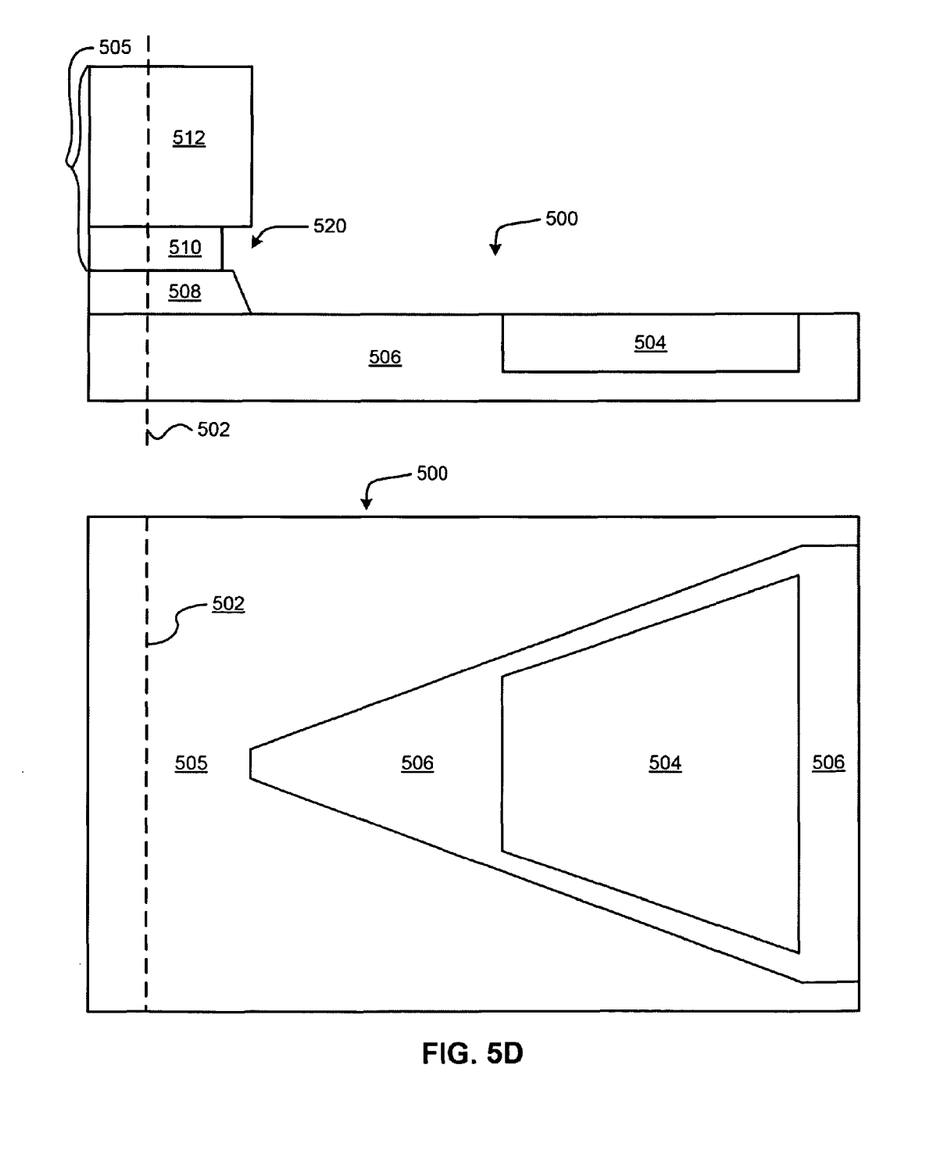

In FIG. 5D, the structure 500 is shown with a portion of the nonmagnetic layer 508 removed where it is not covered by the resist layer 505. Note that the entire exposed portion of the nonmagnetic layer 508 may not be removed, instead, in some approaches, a shadowing effect of the resist structure 505 may cause some of the exposed nonmagnetic layer 508 to remain after the removing, such as is shown in the cross sectional view of structure 500 in FIG. 5D. Also, by removing the nonmagnetic layer 508, portions of the substrate 506 and shaping layer 504 may be exposed where they were not covered by the resist structure 505, as shown in the top view of structure 500 in FIG. 5D.

Figure 5E:
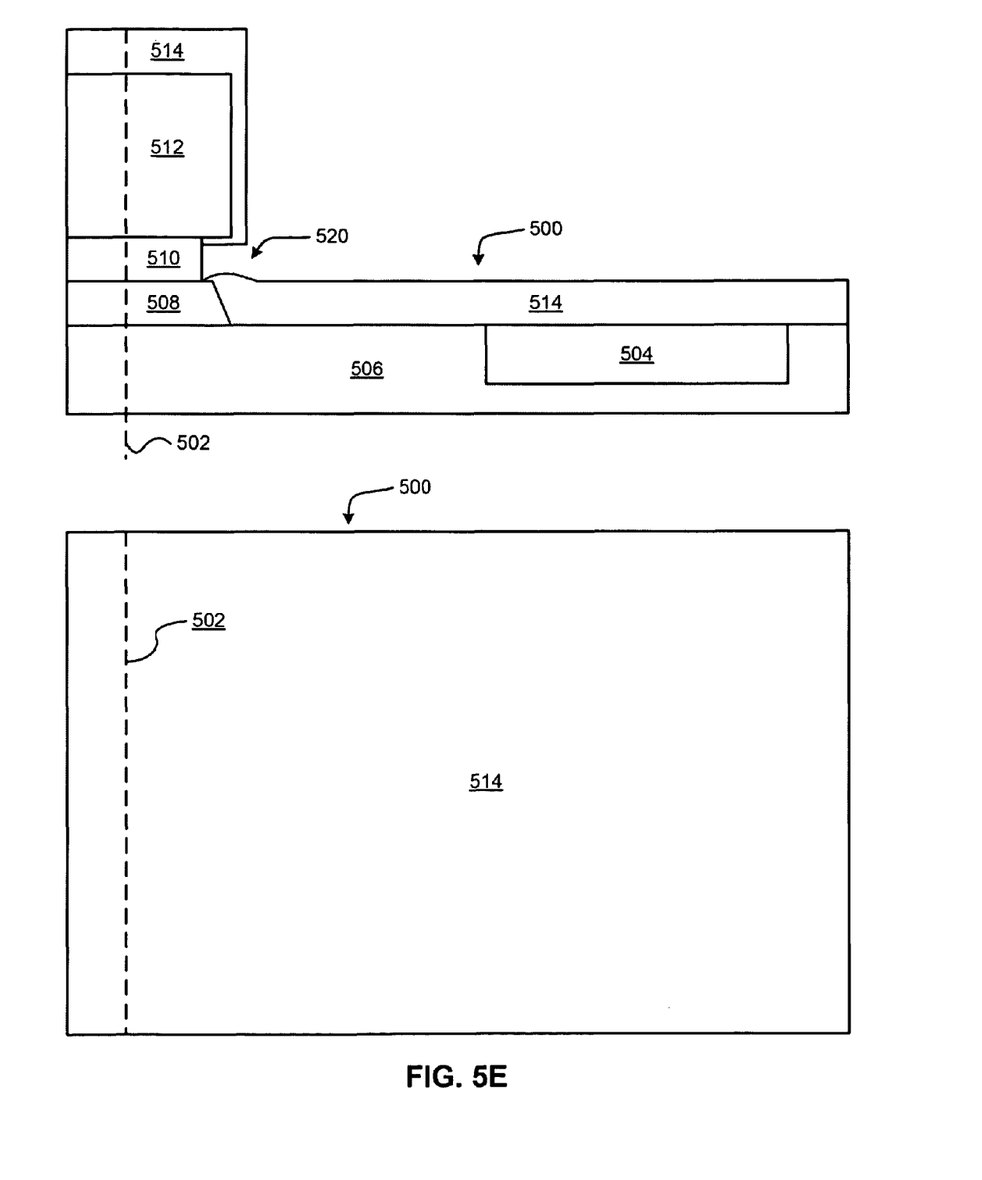

Now referring to FIG. 5E, a magnetic layer 514 may be formed above exposed regions of the substrate 506 and/or shaping layer 504 adjacent a remaining portion of the nonmagnetic layer 508 such that at least portions of the magnetic layer 514 and the remaining portion of the nonmagnetic layer 508 may lie in a common plane. For example, the remaining portion of the nonmagnetic layer 508 and the magnetic layer 514 may be adjacent one another near the undercut 520, possibly with an overlying portion of the magnetic layer 514, as shown in the cross sectional view of structure 500 in FIG. 5E. In some embodiments, a portion of the magnetic layer 514 may be positioned in the undercut 520. Also, in some embodiments, the magnetic layer 514 may be comprised of a high moment metal, such as CoFe, CoFeN, CoNiFe, etc.

In some embodiments, a thickness of the magnetic layer 514 may be about the same as a thickness of the nonmagnetic layer 508. In other embodiments, the thicknesses of the nonmagnetic layer 508 and the magnetic layer 514 may be different. In even more embodiments, the average thickness of the magnetic layer 514 may be about the same as the average thickness of the nonmagnetic layer 508, or may be different.

In some embodiments, an interface between the magnetic layer 514 and the nonmagnetic layer 508 may be oriented at an angle of greater than about 2° from normal to a plane of deposition of the nonmagnetic layer 508. In some embodiments, the angle may be between about 2° and about 85°, more preferably between about 3° and about 45°, even more preferably between about 3° and about 20°.

Also, in some embodiments, the magnetic layer 514 may be formed through plasma vapor deposition (PVD), ion beam deposition (IBD), or any other deposition or application technique known to one of reasonable skill in the relevant art. In some preferred embodiments, the magnetic layer 514 may be formed full film, thus allowing for a simple application that does not involve any additional steps.

In some approaches, the magnetic layer 514 may be about 50 nm in thickness at its thickest point. In some other approaches, the magnetic layer 514 may be about 25 nm to about 75 nm in thickness at its thickest point. Of course, thicker and/or thinner magnetic layers 514 may also be used.

Figure 5F:
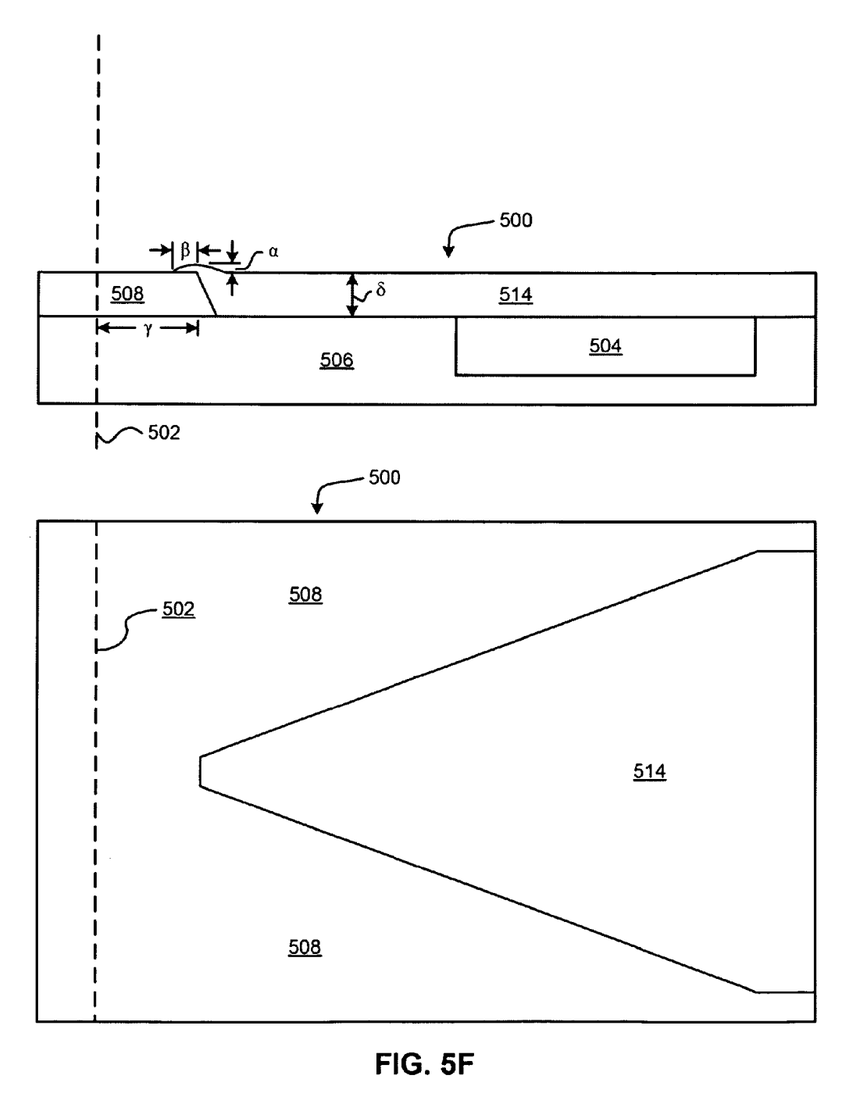

In FIG. 5F, the structure 500 is shown where the resist structure 505, possibly including the resist layer 512 and release layer 510 has been removed. In some embodiments, the resist structure 505 may be removed through baking of the resist structure 505, thereby causing cracks in an overlying material, and contacting the release layer 510 with a solvent to thereby remove the release layer 510 or cause the release layer 510 to disengage from the underlying surface, such as the nonmagnetic layer 508. This may leave the nonmagnetic layer 508 exposed, with a portion of the magnetic layer 514 contacting the nonmagnetic layer 508, possibly at each point where the nonmagnetic layer 508 and magnetic layer 514 contact.

With continued reference to FIG. 5F, some exemplary dimensions may be used to further describe the structure 500. These dimensions are for example only, and in no way should limit the dimensions that the finished structure 500 may have. In some embodiments, the length $\beta$ of overlap of the magnetic layer 514 above the nonmagnetic layer 508 may be between about 60 nm and about 80 nm, but can also be more or less.

Also, in some embodiments, the height $\alpha$ of the overlying portion may be between about 15 nm and about 25 nm, but can also be more or less. In addition, in some embodiments, the distance $\gamma$ from the ABS 502 to the end of the upper surface of the nonmagnetic layer 508 may be between about 100 nm and about 200 nm. Additionally, the thickness $\delta$ of the magnetic layer 514 may be between about 50 nm and about 70 nm.

Figure 5G:
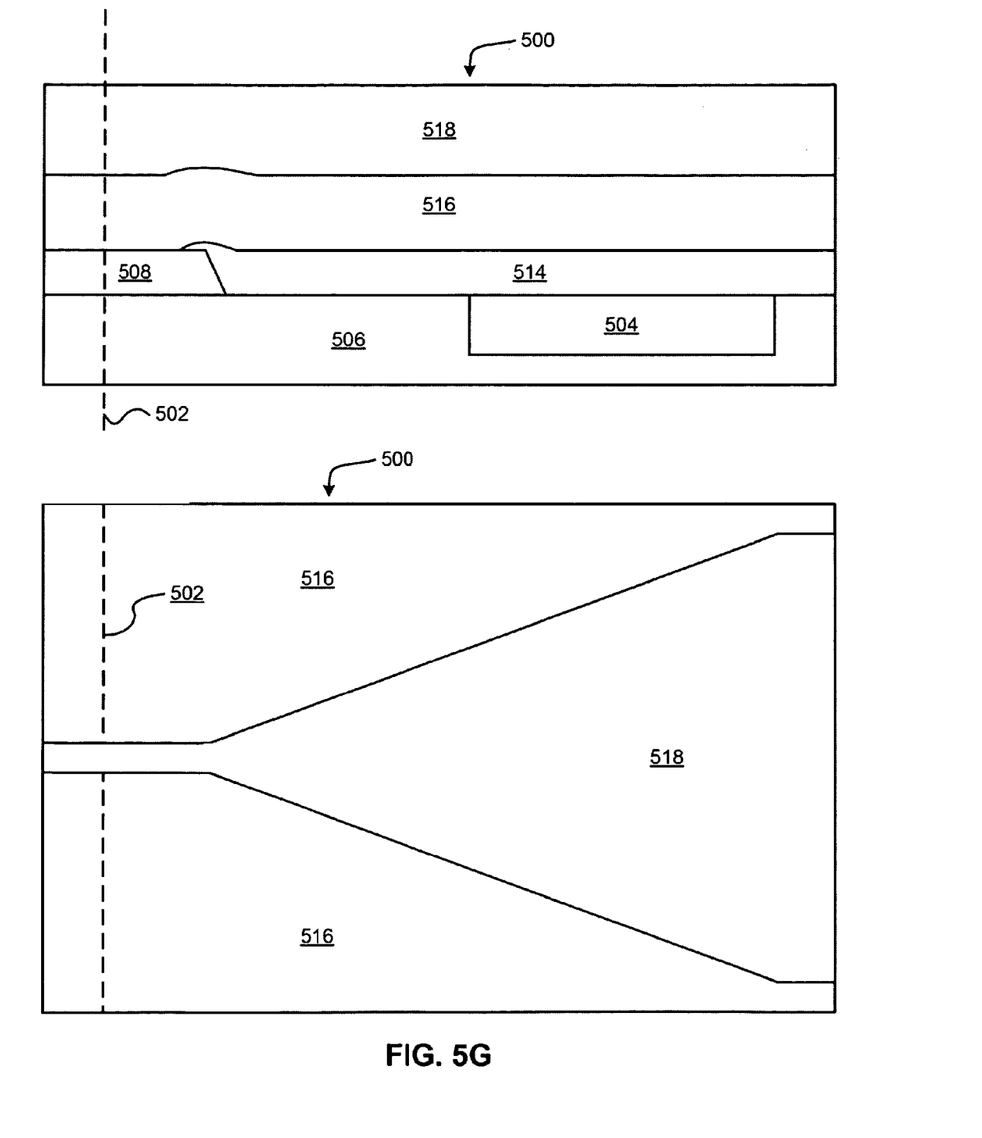

FIG. 5G shows a structure 500 according to one embodiment where a pole layer 516 may be formed above the magnetic layer 514 and the remaining portion of the nonmagnetic layer 508. In some embodiments, the pole layer 516 may be comprised of a laminate, possibly in more than one process. Also, the pole layer may be formed full film.

Figure 5H:
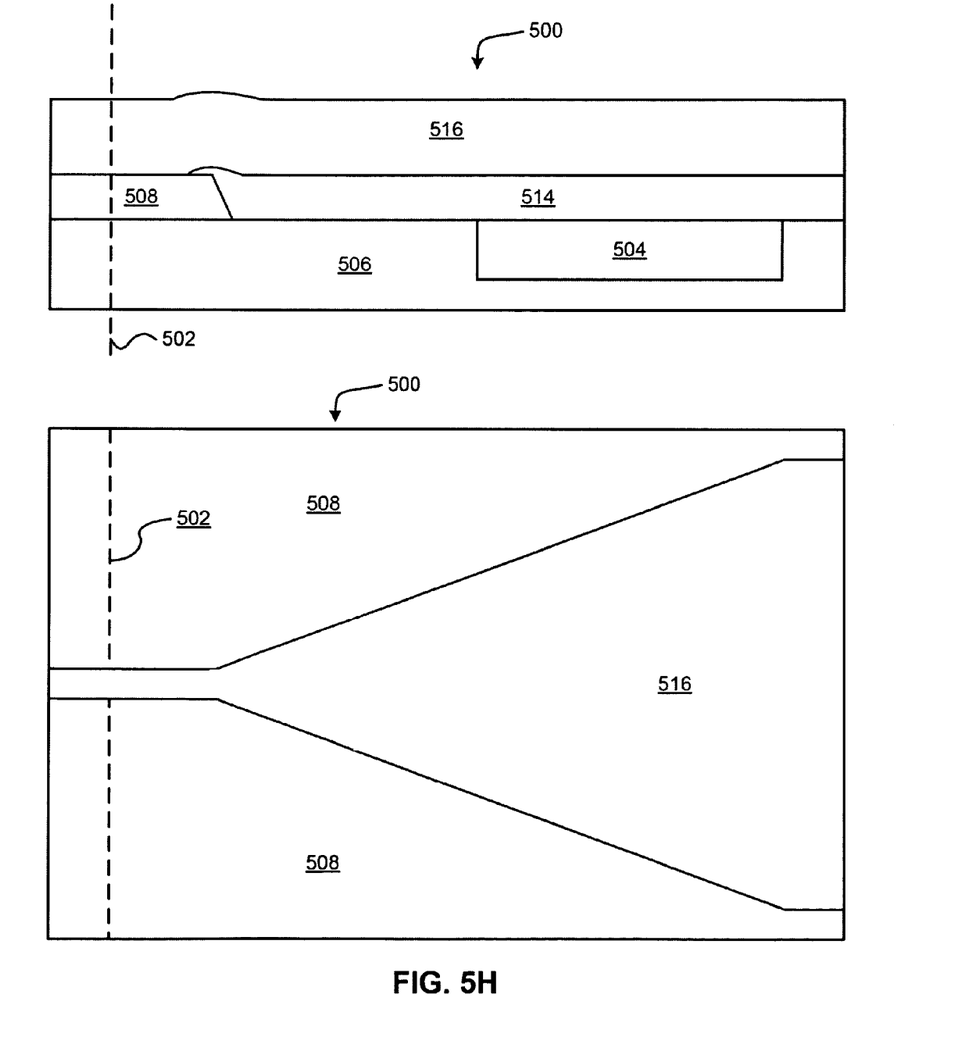

In some embodiments, the pole layer 516 may be formed, possibly full film and/or over a portion of the nonmagnetic layer 508 and the magnetic layer 514 where the pole is to be after processing is completed on the structure 500. A masking layer 518 may be formed over portions of the pole layer 516 which are to define the shape of the pole layer 516, and the unmasked portions of the pole layer 516 may be removed, thereby defining the pole layer 516 shape, as shown in the tope view of structure 500 in FIG. 5H. In further approaches, portions of the magnetic layer 514 not underlying the masking layer 518 may be removed. As shown in FIG. 5H, the masking layer may be removed to expose the upper surface of the remaining pole layer 516.

In preferred embodiments, the structure 500 may be lapped or otherwise formed at the ABS 502 for formation of an ABS end in a region thereof. Of course, in this process of lapping, other structures and/or layers may be formed into an ABS end as well.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
   forming a layer of a nonmagnetic material above an upper surface of a substrate;
   forming a resist structure above the layer of nonmagnetic material, wherein the resist structure has an undercut;
   removing a portion of the layer of nonmagnetic material not covered by the resist structure;
   depositing a layer of magnetic material above the substrate adjacent a remaining portion of the layer of nonmagnetic material such that at least portions of the layer of magnetic material and the remaining portion of the layer of nonmagnetic material lie in a common plane, wherein a portion of the layer of magnetic material is positioned in the undercut;

removing the resist structure; and forming a write pole above the layer of magnetic material and the remaining portion of the layer of nonmagnetic material, thereby forming a stepped pole structure having the write pole and the layer of magnetic material.

2. A method as recited in claim 1, wherein the substrate comprises a shaping layer for a perpendicular writer pole.

3. A method as recited in claim 1, wherein the resist structure is a bilayer photoresist comprising a photoresist and a release layer.

4. A method as recited in claim 1, wherein a thickness of the layer of magnetic material is about the same as a thickness of the layer of nonmagnetic material.

5. A method as recited in claim 1, wherein removing the resist structure includes baking the resist structure for creating cracks in an overlying material, and contacting a release layer of the resist structure with a solvent.

6. A method as recited in claim 1, wherein forming the write pole above the layer of magnetic material includes forming a write pole layer, masking the write pole layer for defining the write pole, and removing unmasked areas of the write pole layer; and further comprising removing portions of the layer of magnetic material not underlying the mask.

7. A method as recited in claim 1, wherein the layer of magnetic material has a portion that overlies the remaining portion of the layer of nonmagnetic material, and wherein the write pole has an indentation in a lower surface thereof that conforms to a shape of an upper surface of the portion of the layer of magnetic material that overlies the remaining portion of the layer of nonmagnetic material.

8. A method as recited in claim 1, wherein the layer of magnetic material is formed by at least one of plasma vapor deposition and ion beam deposition.

9. A method as recited in claim 1, wherein the layer of magnetic material has a portion that overlies the remaining portion of the layer of nonmagnetic material, wherein the portion of the layer of magnetic material that overlies the remaining portion of the layer of nonmagnetic material has a thickness of less than about 25 nm.

10. A method as recited in claim 1, wherein an interface between the layer of magnetic material and the layer of nonmagnetic material is oriented at an angle of greater than 2° from normal to a plane of deposition of the layer of nonmagnetic material.

11. A method, comprising:

forming a layer of a nonmagnetic material above an upper surface of a substrate, wherein the substrate comprises a shaping layer for a perpendicular writer pole;

forming a resist structure above the layer of nonmagnetic material, wherein the resist structure has an undercut;

removing a portion of the layer of nonmagnetic material not covered by the resist structure;

depositing a layer of magnetic material above the substrate adjacent a remaining portion of the layer of nonmagnetic material such that at least portions of the layer of magnetic material and the remaining portion of the layer of nonmagnetic material lie in a common plane, wherein a thickness of the layer of magnetic material is about the same as a thickness of the layer of nonmagnetic material, wherein a portion of the layer of magnetic material is positioned in the undercut;

removing the resist structure; and forming a write pole above the layer of magnetic material and the remaining portion of the layer of nonmagnetic material.

12. A method as recited in claim 11, wherein the layer of magnetic material has a portion that overlies the remaining portion of the layer of nonmagnetic material, and wherein the write pole has an indentation in a lower surface thereof that conforms to a shape of an upper surface of the portion of the layer of magnetic material that overlies the remaining portion of the layer of nonmagnetic material.

13. A method as recited in claim 11, wherein removing the resist structure includes baking the resist structure for creating cracks in an overlying material, and contacting a release layer of the resist structure with a solvent.

14. A method as recited in claim 11, wherein forming the write pole above the layer of magnetic material includes forming a write pole layer, masking the write pole layer for defining the write pole, and removing unmasked areas of the write pole layer.

15. A method as recited in claim 11, wherein the write pole and the layer of magnetic material together form a stepped pole structure.

16. A method as recited in claim 11, wherein the layer of magnetic material is formed by at least one of plasma vapor deposition and ion beam deposition.

17. A method as recited in claim 11, wherein the layer of magnetic material has a portion that overlies the remaining portion of the layer of nonmagnetic material.

18. A method as recited in claim 11, wherein an interface between the layer of magnetic material and the layer of nonmagnetic material is oriented at an angle of greater than 2° from normal to a plane of deposition of the layer of nonmagnetic material.

19. A method as recited in claim 1, wherein the layer of magnetic material has side edges that taper together towards an air bearing surface of the writer.

* * * * *